US012809697B2

(12) United States Patent
Savalle et al.

(10) Patent No.: US 12,809,697 B2
(45) Date of Patent: Nov. 24, 2026

(54) API CONSOLIDATION RECOMMENDATIONS TO IMPROVE WEB APPLICATION QOE

(71) Applicant: Cisco Technology, Inc., San Jose, CA (US)

(72) Inventors: Pierre-André Savalle, Rueil-Malmaison (FR); Grégory Mermoud, Venthône (CH); Jean-Philippe Vasseur, Combloux (FR); Eduard Schornig, Haarlem (NL); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 541 days.

(21) Appl. No.: 18/201,952

(22) Filed: May 25, 2023

(65) Prior Publication Data

US 2024/0394121 A1 Nov. 28, 2024

(51) Int. Cl.
*G06F 9/54* (2006.01)
*G06F 9/451* (2018.01)

(52) U.S. Cl.
CPC .............. *G06F 9/542* (2013.01); *G06F 9/451* (2018.02)

(58) Field of Classification Search
CPC ...... G06F 9/542; G06F 9/451; G06F 11/3466; H04L 41/0883; H04L 43/0852; H04L 41/122; G06N 20/00
USPC .......................................................... 719/329
See application file for complete search history.

(56) References Cited

U.S. PATENT DOCUMENTS

| | | | | |
|---|---|---|---|---|
| 10,540,270 | B1 | 1/2020 | Surkatty et al. | |
| 2004/0001517 | A1* | 1/2004 | Lamberton | H04Q 3/0091 370/522 |
| 2004/0030747 | A1* | 2/2004 | Oppermann | G06F 11/3414 714/E11.193 |
| 2005/0289152 | A1* | 12/2005 | Earl | G06F 16/184 |
| 2006/0270399 | A1* | 11/2006 | Qi | H04L 43/0852 455/423 |
| 2007/0083500 | A1* | 4/2007 | Zibitsker | G06F 9/5083 |
| 2007/0174286 | A1* | 7/2007 | Seitz | G06F 16/951 |
| 2007/0207800 | A1* | 9/2007 | Daley | H04W 8/22 455/425 |

(Continued)

OTHER PUBLICATIONS

Grosse, et al., "Shift-Invariant Sparse Coding for Audio Classification", UAI '07: Proceedings of the Twenty-Third Conference on Uncertainty in Artificial Intelligence, Jul. 2007, pp. 149-158, AUAI Press.

(Continued)

*Primary Examiner* — Tuan C Dao
(74) *Attorney, Agent, or Firm* — Lee & Hayes, P.C.

(57) ABSTRACT

In one embodiment, a device obtains trace data indicative of application programming interface calls made during sessions between clients and an application accessible via a network. The device identifies, based on the trace data, a set of calls among the application programming interface calls that are frequently co-occurring. The device quantifies a latency savings expected to occur were the set of calls to be consolidated into a singular call instead of being made separately. The device provides, to a user interface, a recommendation to consolidate the set of calls into a consolidated call that indicates the latency savings.

20 Claims, 11 Drawing Sheets

(56) References Cited

U.S. PATENT DOCUMENTS

| | | | | |
|---|---|---|---|---|
| 2007/0233693 | A1* | 10/2007 | Baxter | H04L 67/60 |
| 2008/0059631 | A1* | 3/2008 | Bergstrom | H04L 67/1057 709/224 |
| 2008/0126385 | A1* | 5/2008 | Gaurav | H04L 67/02 707/999.102 |
| 2008/0148242 | A1* | 6/2008 | Cobb | G06F 11/3466 717/130 |
| 2008/0177857 | A1* | 7/2008 | Chakra | H04L 67/1095 709/225 |
| 2009/0248652 | A1* | 10/2009 | Iwayama | G06F 16/3341 |
| 2011/0161959 | A1* | 6/2011 | Sharon | G06F 9/4843 718/101 |
| 2013/0100859 | A1* | 4/2013 | Martin | H04M 15/48 370/259 |
| 2013/0124669 | A1* | 5/2013 | Anderson | G06F 11/301 709/224 |
| 2013/0191511 | A1* | 7/2013 | Liu | H04L 65/1045 709/219 |
| 2015/0350211 | A1* | 12/2015 | Burgess | H04L 63/10 726/30 |
| 2017/0257410 | A1* | 9/2017 | Gattis | H04L 51/52 |
| 2018/0129688 | A1* | 5/2018 | Colrain | G06F 16/217 |
| 2018/0248829 | A1* | 8/2018 | Hardee | H04L 51/214 |
| 2018/0285432 | A1* | 10/2018 | Das | G06F 16/22 |
| 2019/0138160 | A1* | 5/2019 | Deets, Jr. | H04L 51/212 |
| 2020/0117522 | A1* | 4/2020 | Xiao | G06F 9/547 |
| 2020/0133441 | A1* | 4/2020 | Smith | G06F 3/0481 |
| 2020/0137097 | A1 | 4/2020 | Zimmermann et al. | |
| 2020/0177710 | A1* | 6/2020 | Wyatt | G06F 9/451 |
| 2022/0027431 | A1 | 1/2022 | Zheng et al. | |
| 2022/0321483 | A1 | 10/2022 | Zacks et al. | |
| 2023/0047837 | A1 | 2/2023 | Chilupuri et al. | |

OTHER PUBLICATIONS

"Quality of Experience for Web-Based Applications", online: https://wifihelp.arista.com/post/quality-of-experience-for-web-based-applications, accessed May 25, 2023, 6 pages, Arista Networks.

* cited by examiner

API CONSOLIDATION RECOMMENDATIONS TO IMPROVE WEB APPLICATION QOE

TECHNICAL FIELD

The present disclosure relates generally to computer networks, and, more particularly, to application programming interface (API) consolidation recommendations to improve web application quality of experience (QoE).

BACKGROUND

Many applications today are increasingly being hosted online. Traditionally, the quality of experience (QoE) of an online application has been considered largely a function of the performance of the network itself. Indeed, packet loss, jitter, delay, etc., can often influence the experience of an application user. Beyond simply the performance of the network, though, the execution of the application itself can also affect its QoE.

By way of example, web applications often rely on application programming interface (API) calls between endpoint clients and servers. Each API call requires a certain amount of time to complete that is a function of the round trip time between the endpoint client and the server. Many small API calls can, thus, result in additional latency that could affect the QoE of the application. Rarely, though, do development teams make a concerted effort to optimize these calls, as each development team is often concerned only with their own responsibilities.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
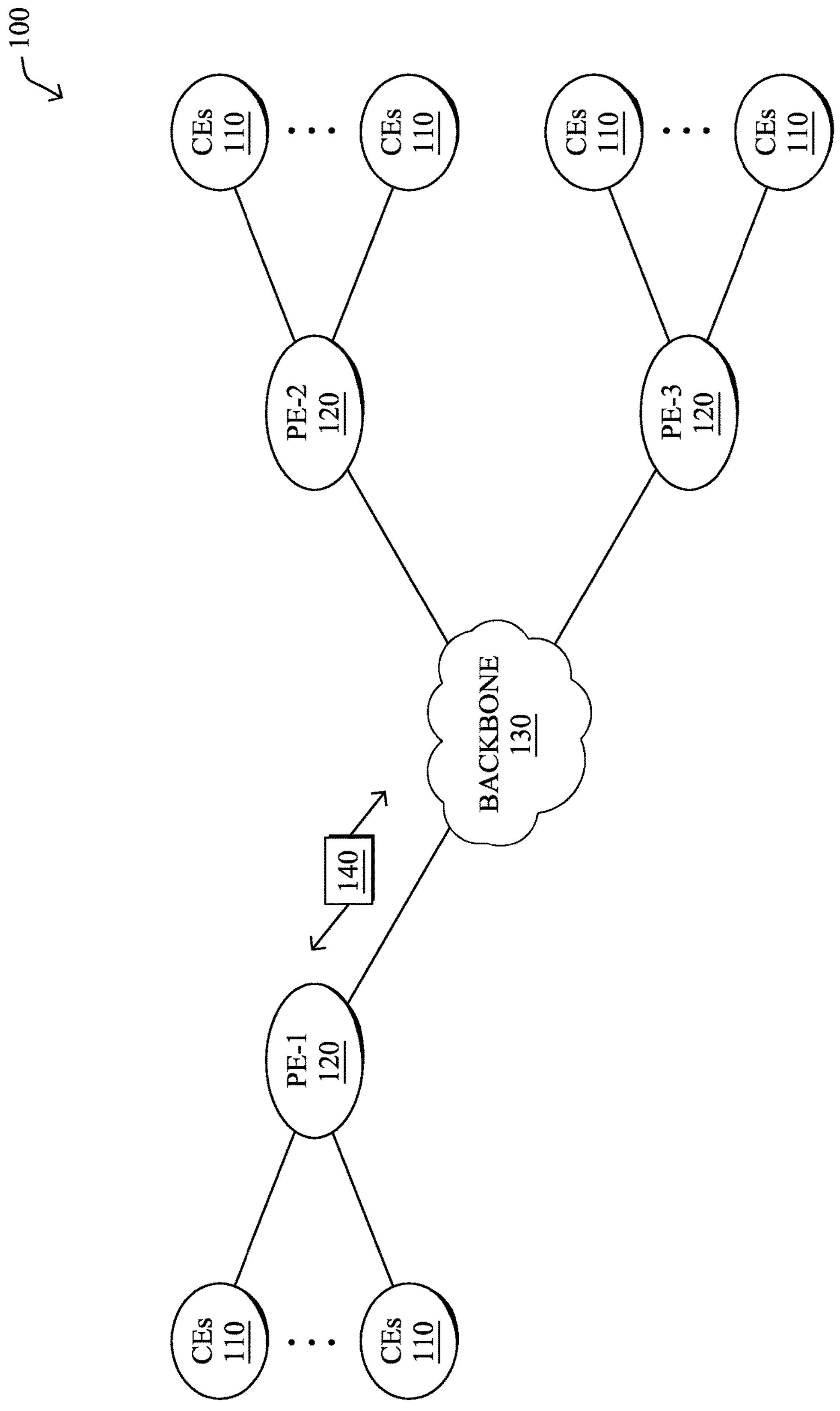
FIGS. 1A-1B illustrate an example communication network.

According to one or more embodiments of the disclosure, a device obtains trace data indicative of application programming interface calls made during sessions between clients and an application accessible via a network. The device identifies, based on the trace data, a set of calls among the application programming interface calls that are frequently co-occurring. The device quantifies a latency savings expected to occur were the set of calls to be consolidated into a singular call instead of being made separately. The device provides, to a user interface, a recommendation to consolidate the set of calls into a consolidated call that indicates the latency savings.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
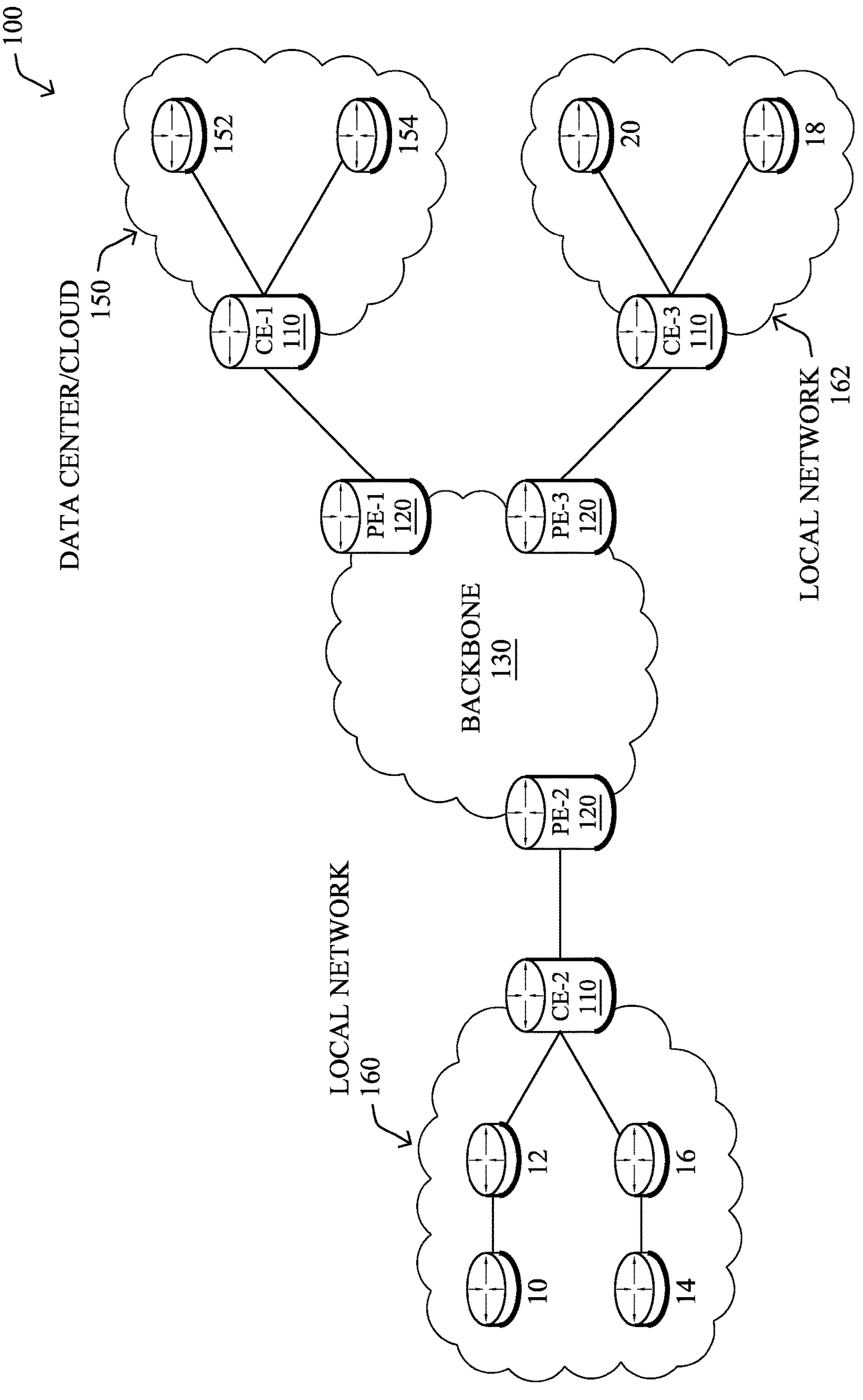

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
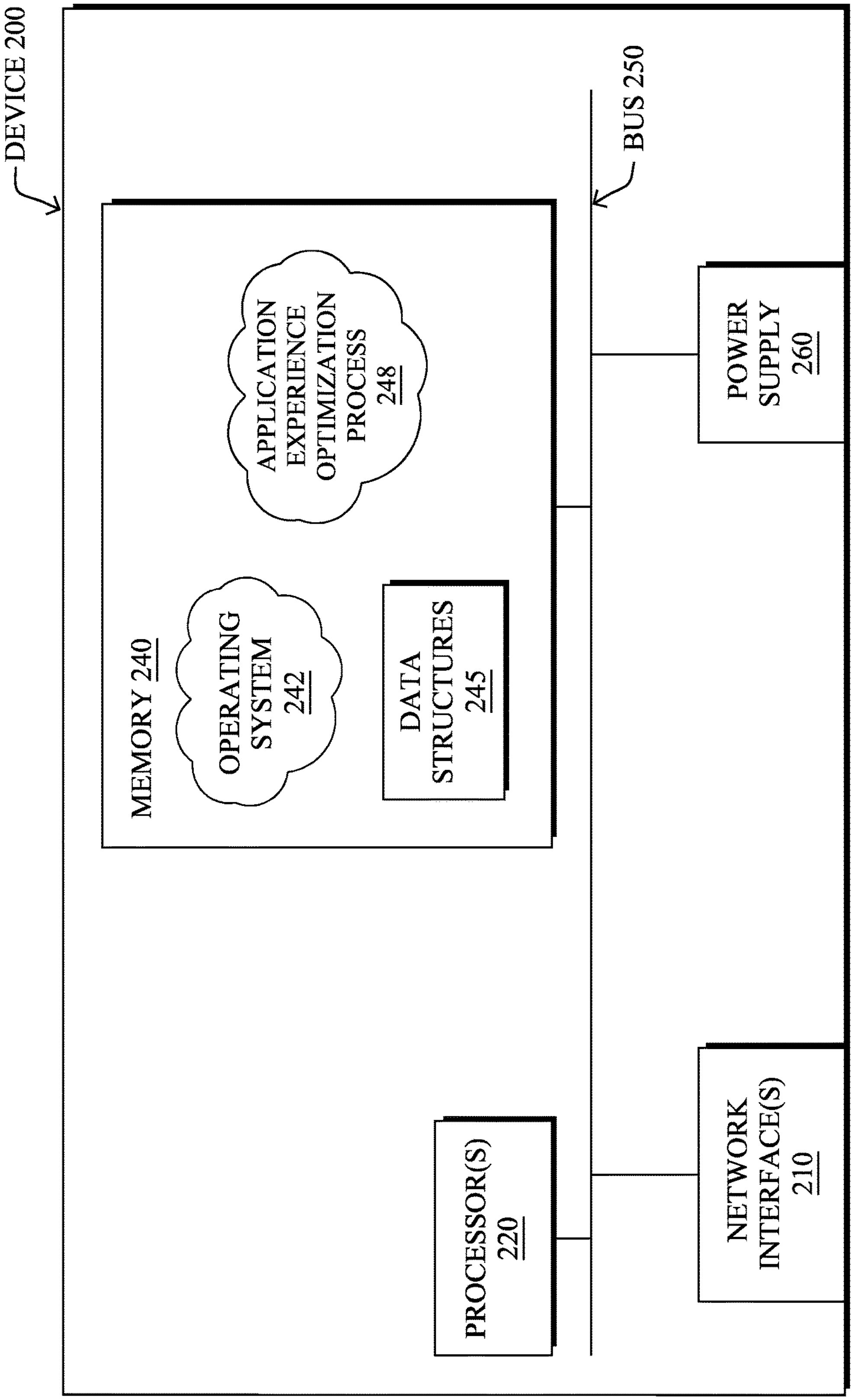
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
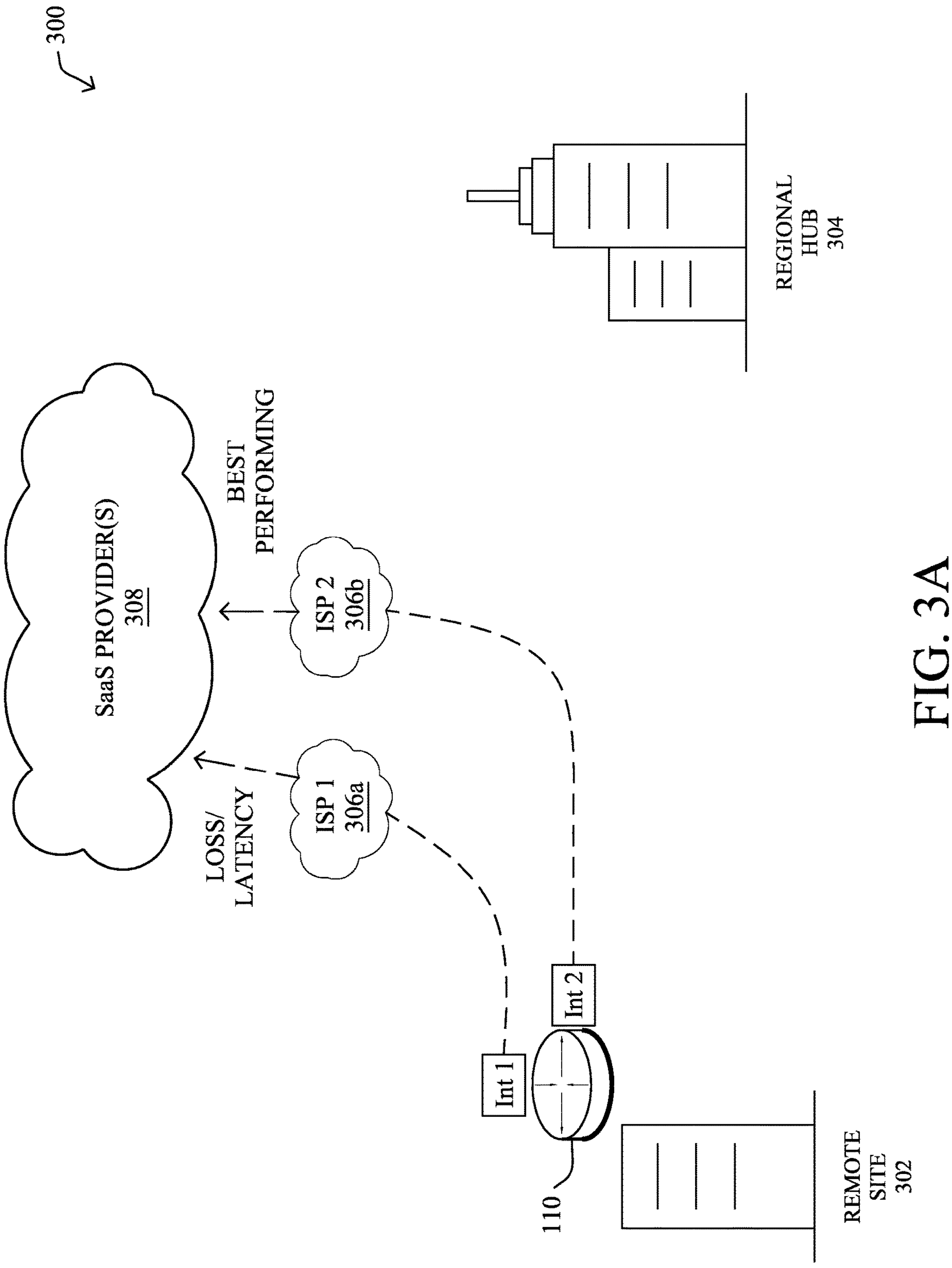
FIGS. 3A-3B illustrate example network deployments.
Figure 3B:
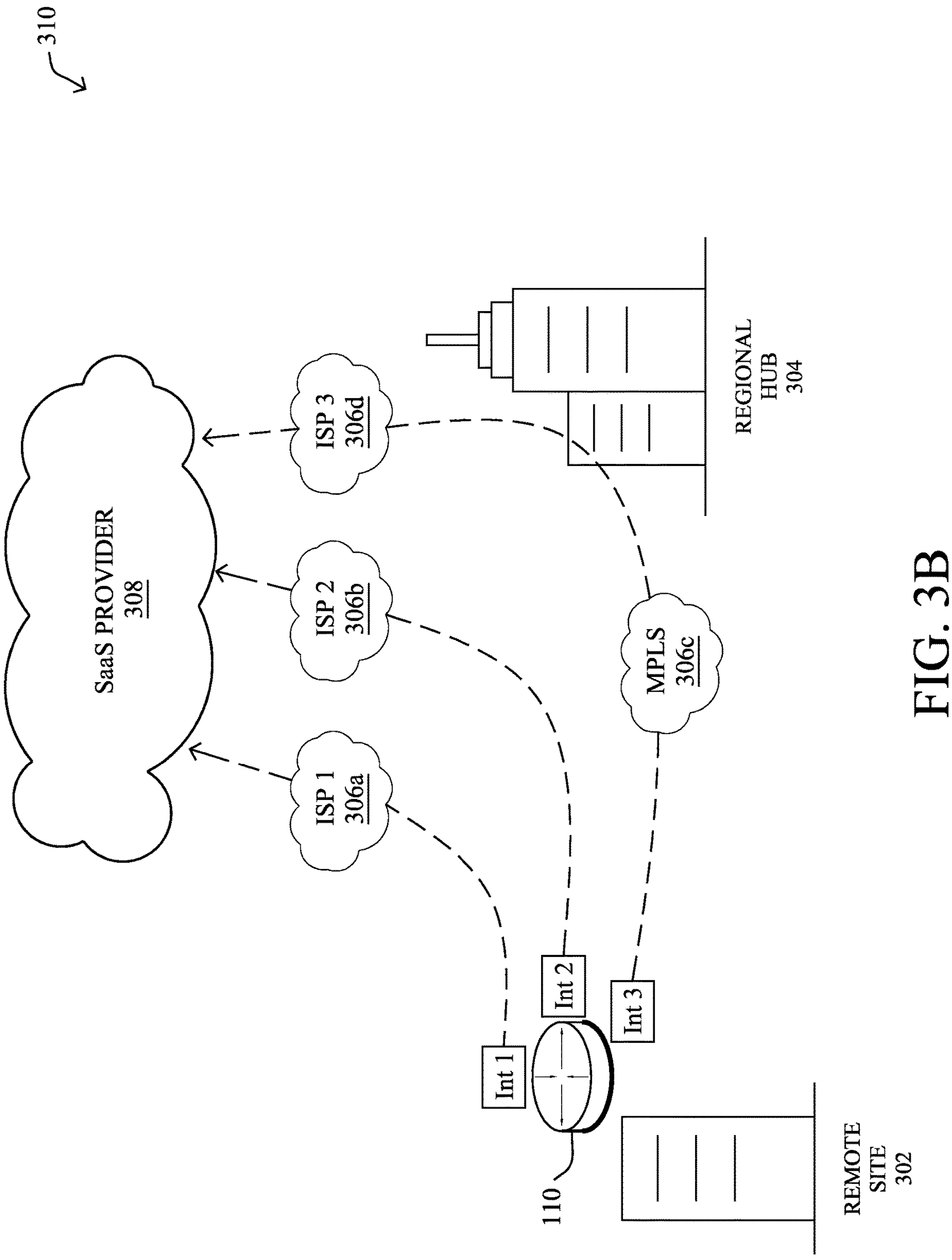

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306*a*, denoted ISP 1 in FIG. 3A. Likewise, a second interface of router 110, Int 2, may establish a backhaul path with SaaS provider(s) 308 via a second ISP 306*b*, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306*b*. In contrast to the example in FIG. 3A, Int 3 of router 110 may establish a third path to SaaS provider(s) 308 via a private corporate network 306*c* (e.g., an MPLS network) to a private data center or regional hub 304 which, in turn, provides connectivity to SaaS provider(s) 308 via another network, such as a third ISP 306*d*.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
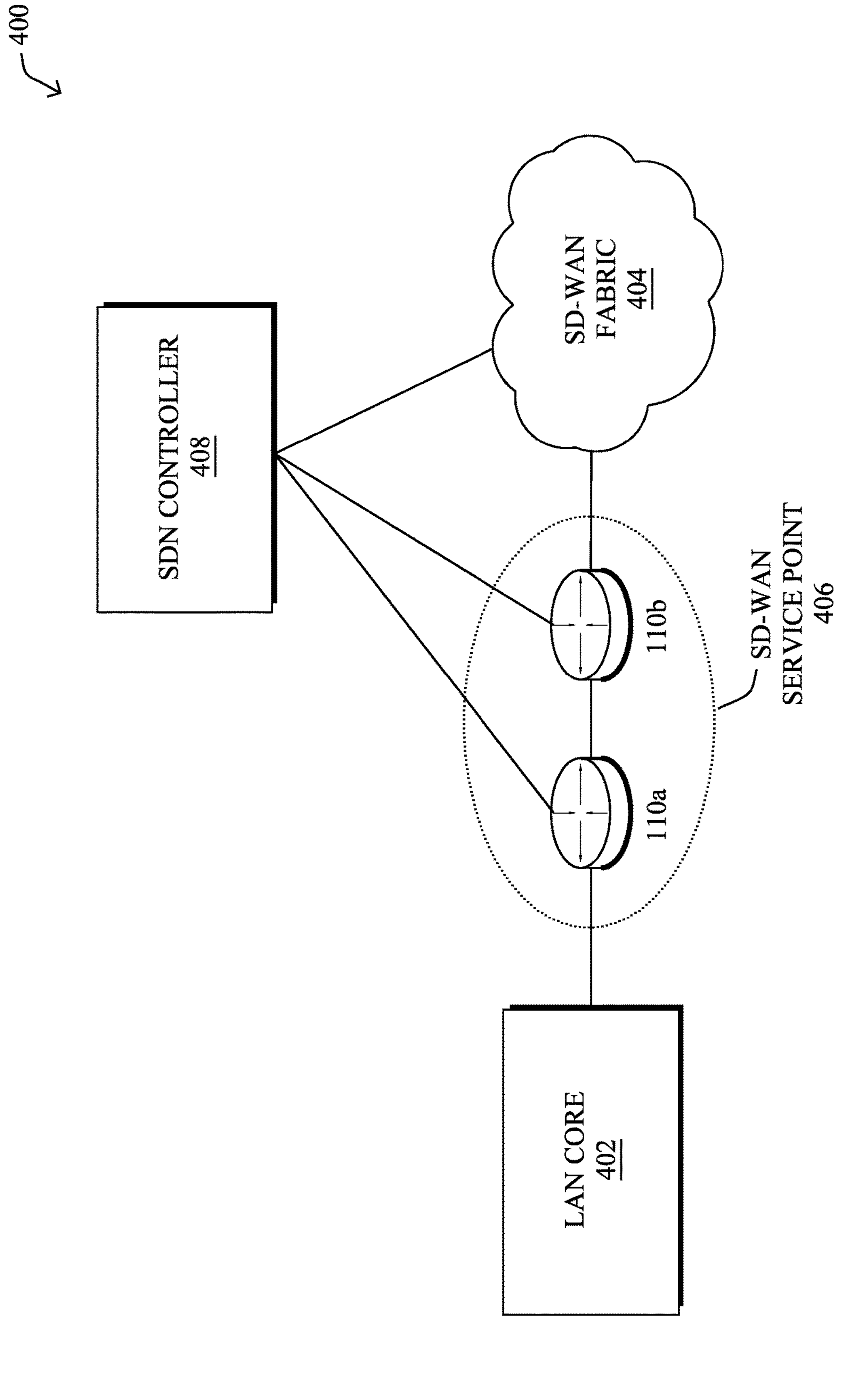
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110*a*-110*b*.

Overseeing the operations of routers 110*a*-110*b* in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela. CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
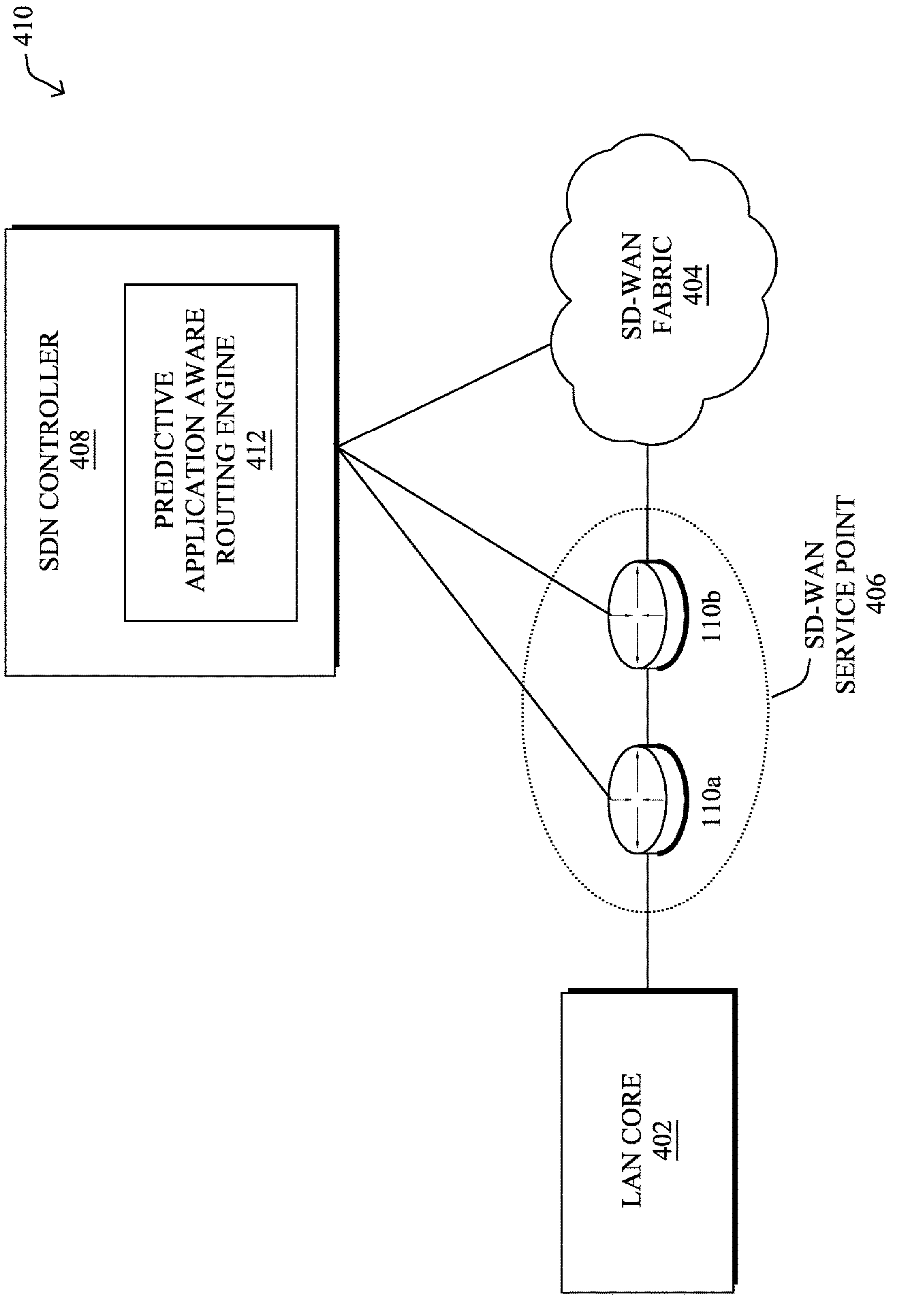

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, web applications often rely on application programming interface (API) requests between end user clients and servers, and the performance of these requests can have a large impact on the quality of experience (QoE). Application performance monitoring (APM) solutions today allow for the monitoring of such requests end-to-end from the client down to micro-services. Similarly, real user monitoring (RUM) allows for the monitoring of how all the requests and browser rendering actions are sequenced and impact the quality of experience of real users. However, using APM and RUM to improve applications requires manual engineering work and experience, and can be difficult.

A common problem noted herein is that the use of many small API calls can result in additional overhead, due to many round trips between the client and the server. This is understandable, as APIs developed by different teams might be separate, although they can be often called together, or following general separation-of-concerns principles. This can include queries for different types of data that always occur at the same time because they are always needed together, or multiple queries for the same type of data with different parameters (e.g., if the API endpoint only supports returning daily data but data is required over a week). Batching frequently occurring requests together can improve performance by reducing the latency, as well as the throughput in some cases (e.g., when compression can operate more efficiently on groups of requests with response payloads involving similar sequences of tokens than on the individual requests).

—API Consolidation Recommendations to Improve Web Application QoE—

The techniques herein automatically analyze API traces (e.g., REST API traces) from user and backend sources to suggest ways to reduce network-related latency issues that affect the QoE of an application by grouping frequently occurring sequences of requests into single chunks, thereby allowing to improve web application QoE without expensive re-engineering work or moving to potentially complex dynamic query languages.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device obtains trace data indicative of application programming interface calls made during sessions between clients and an application accessible via a network. The device identifies, based on the trace data, a set of calls among the application programming interface calls that are frequently co-occurring. The device quantifies a latency savings expected to occur were the set of calls to be consolidated into a singular call instead of being made separately. The device provides, to a user interface, a recommendation to consolidate the set of calls into a consolidated call that indicates the latency savings.

Figure 5:
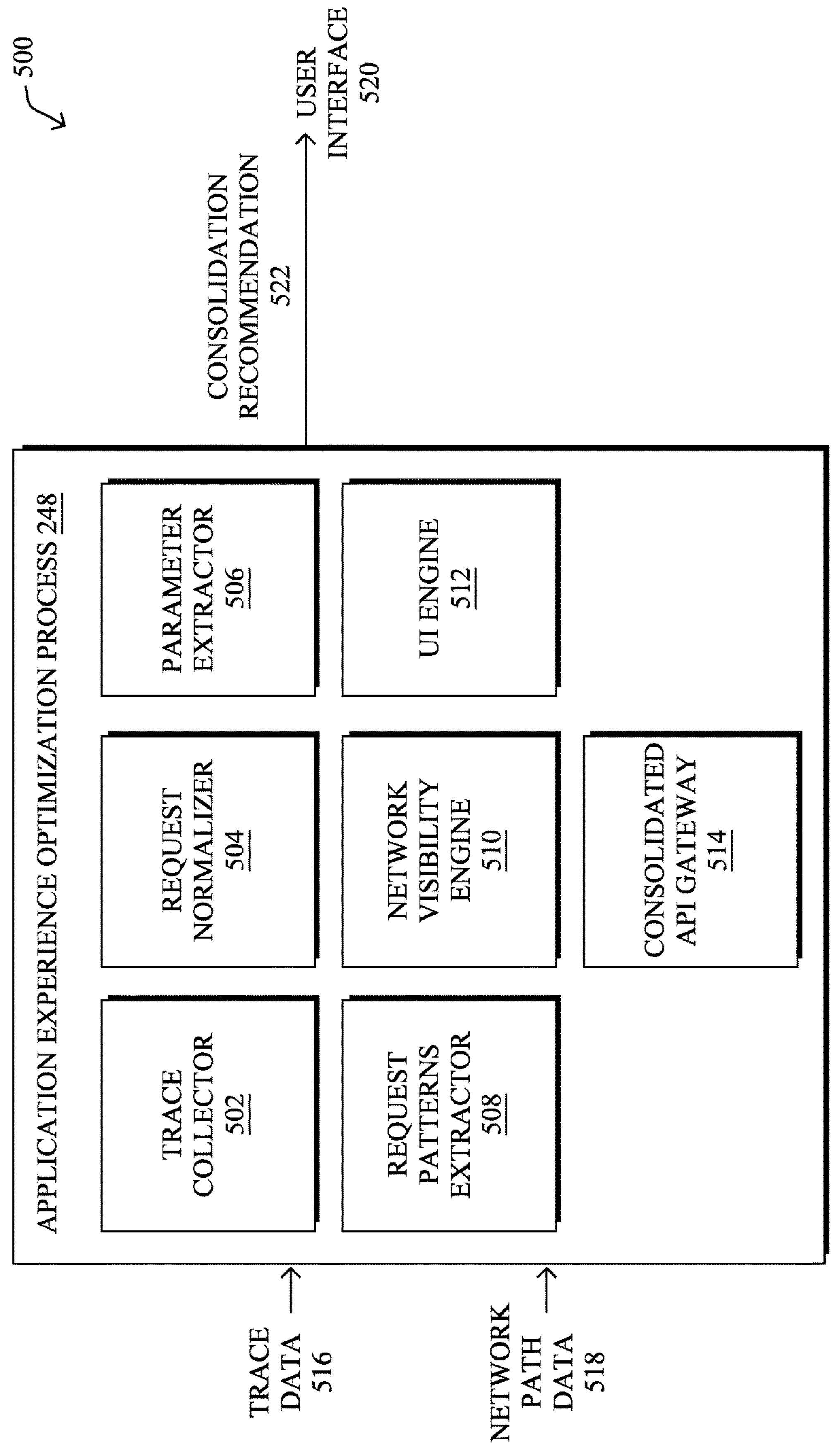
FIG. 5 illustrates an example architecture for application programming interface (API) consolidation recommendations to improve web application quality of experience (QoE)

Operationally, FIG. 5 illustrates an example architecture for API consolidation recommendations to improve web application QoE, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, a firewall, etc.), another device or service in communication therewith, or the like, to implement the techniques herein.

As shown, application experience optimization process 248 may include any or all of the following components: trace collector 502, request normalizer 504, parameter extractor 506, request patterns extractor 508, network visibility engine 510, user interface (UI) engine 512, and/or consolidated API gateway 514. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

In various embodiments, trace collector 502 may be responsible for collecting trace data 516 for analysis, on a pull or push basis. In general, trace data 516 may be generated by any number APM and/or RUM platforms and include APM and/or RUM traces, accordingly. Examples of such platforms today include Datadog, New Relic, AppDynamics, and custom systems based on OpenTelemetry.

Request normalizer 504 may be responsible for merging trace data 516 into a database of normalized request information. Indeed, not all requests of all applications may be covered equally by APM or by RUM, and the techniques herein are able to derive recommendations, even with partial coverage. To do so, in various embodiments, request normalizer 504 may:

- For RUM, a session identifier is usually available, and request normalizer 504 may use this to group API calls/requests to the APIs of interest.
- For APM, only top-level spans are retained, and request normalizer 504 may group them by session identifier, when available. When no session concept is present, request normalizer 504 may use a session window grouping where spans are grouped together if they are less than a certain time apart (e.g., a new session starts if a span occurs more than one hour after the last span for a given user identifier). Request normalizer 504 may also use additional keys to further differentiate multiple concurrent sessions of a single user (e.g., device information such as the user agent).
- When both RUM information and APM information is available for a given API call, request normalizer 504 may retain the RUM data for further analysis and disregard the corresponding APM information, as it is usually less precise in terms of session information.

For instance, in the case of a successful HTTP GET request, request normalizer 504 may then output a series of normalized records such as the following:

- Session identifier
- HTTP scheme, netloc and query path (e.g., https://api-.corp.com/v1/entity)
- HTTP query parameter string (e.g., foo=1&bar=abcd)
- Absolute timestamp
- Time since start of the session.

In various embodiments, parameter extractor 506 takes the normalized records from request normalizer 504 and identifies parts of the query/call paths that are variable parameters, replacing them with unique placeholders for the rest of the user session. Doing so makes it possible to identify recurring patterns, even though precise parameter values may change between sessions or occurrences. For instance, consider the corresponding requests in two separate user sessions:

Session 1, User A:
- /v1/entity/abcedf/details
- /v1/entity/abcdef/links
- /v1/other-entity
- /v1/entity/abcdef/updates Session 2, User B:
- /v1/entity/xxxxxx/details
- /v1/entity/xxxxxx/links
- /v1/other-entity
- /v1/some-other-entity
- /v1/yet-another-entity
- /v1/entity/xxxxxx/updates In such a case, parameter extractor 506 may transform the requests in each session into the following:

Session 1, User A:
- /v1/entity/A/details
- /v1/entity/A/links
- /v1/other-entity
- /v1/entity/A/updates Session 2, User B:
- /v1/entity/A/details
- /v1/entity/A/links
- /v1/other-entity
- /v1/some-other-entity
- /v1/yet-another-entity
- /v1/entity/A/updates where 'A' is a placeholder.

Parameter extractor 506 can be implemented using any or all of the following approaches:

- Heuristics to inspect each fragment of the path and using regular expressions. Here, numerical identifiers or universally unique identifier (UUID)-like identifiers are likely to be parameters.
- Forming a tree using a large set of such paths from different sessions, with one path fragment per level. For instance, nodes that have a larger number of children may be more likely to correspond to parameters.

Request patterns extractor 508 may identify frequently occurring sequences consisting of a few API calls based on the records generated by parameter extractor 506. In one embodiment, request patterns extractor 508 may do so by constructing a co-occurrence matrix. Here, request patterns extractor 508 may do so as follows:

1. Discretize the time into T time bins, where the first bin corresponds to the start of the session and further bins corresponds to further time intervals relative to the start of the session.
2. Assuming N unique query/call paths Q_1, . . . , Q_N out of parameter extractor 506, build an N×N matrix where the (i,j)-th entry indicates the fraction of times where queries Q_i and Q_j have fallen into the same time bin, out of all of their occurrences. When the number is close to 1, it may be beneficial to group both queries together to reduce round trips.

Figure 6A:
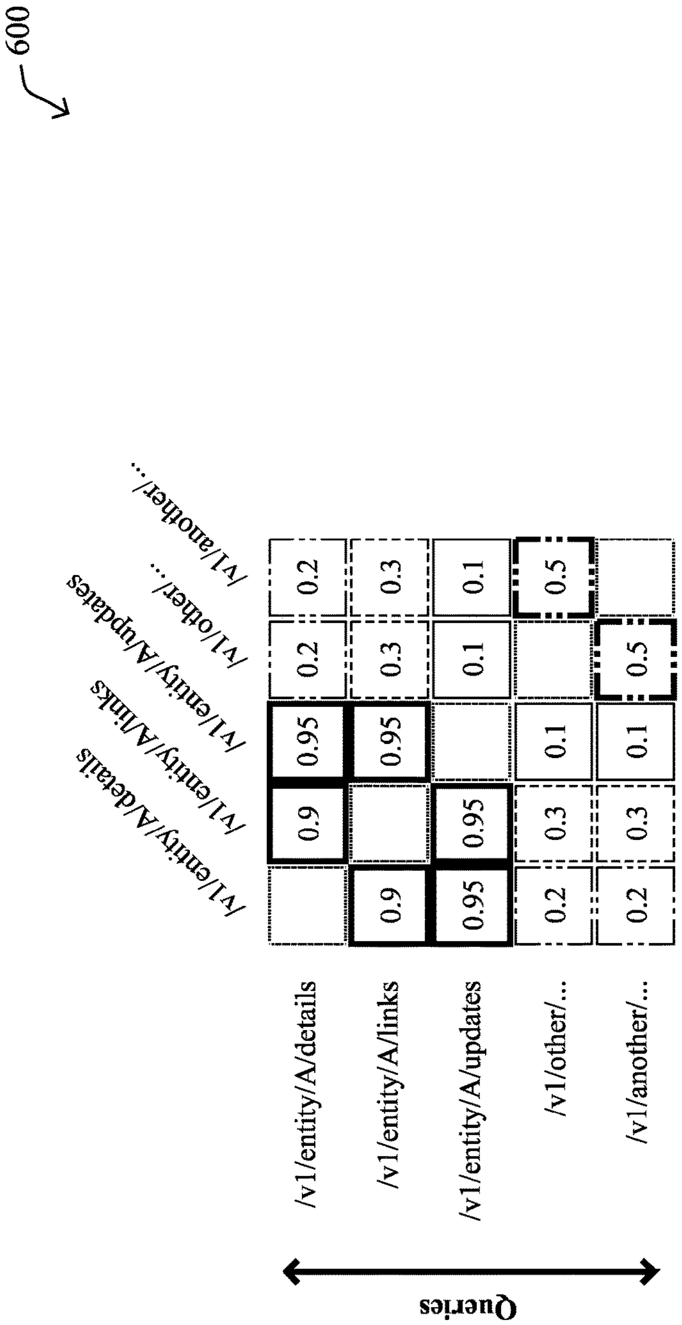
FIGS. 6A-6B illustrate examples of identifying co-occurring API calls.

FIG. 6A illustrates an example co-occurrence matrix 600 with N=5 queries, in some embodiments. As shown, each cell of matrix 600 represents the fraction of time where a given query/call path was used within the same time window as that of another query/call path. As can be seen, certain queries very rarely occur around the same time, such as/v1/another/- and/v1/entity/A/updates. Conversely, other queries almost always occur around the same time, such as/v1/entity/A/details and/v1/entity/A/updates.

In another embodiment, request patterns extractor 508 may employ more advanced techniques leveraging machine learning models, to identify the frequently co-occurring API calls/queries. As an example, request patterns extractor 508 could use shift-invariant sparse coding, which learns short recurring patterns in a set of signals and attempts to decompose the signals using a small number of such patterns, which can be shifted around with time:

- Request patterns extractor 508 may represent each session as a N×T matrix, where N is the number of unique query/call paths out of parameter extractor 506, and T the number of time bins. The (i,t)-th entry of the matrix is set when query Q_i was used in the t-th time bin. This is akin to an audio spectrogram, where amplitudes for audio frequencies are replaced by occurrences of certain queries.

request patterns extractor 508 may cast the problem in terms of machine learning, to decompose all such matrices using a small number of recurring patterns of size N×K, in addition to residual terms. K is the number of time bins that a pattern can cover and will usually be much smaller than T: this allows request patterns extractor 508 to capture patterns where queries occur in short succession after each other and are not in the same time bin.

request patterns extractor 508 then then examine the recurring patterns to extract the corresponding queries.

Figure 6B:
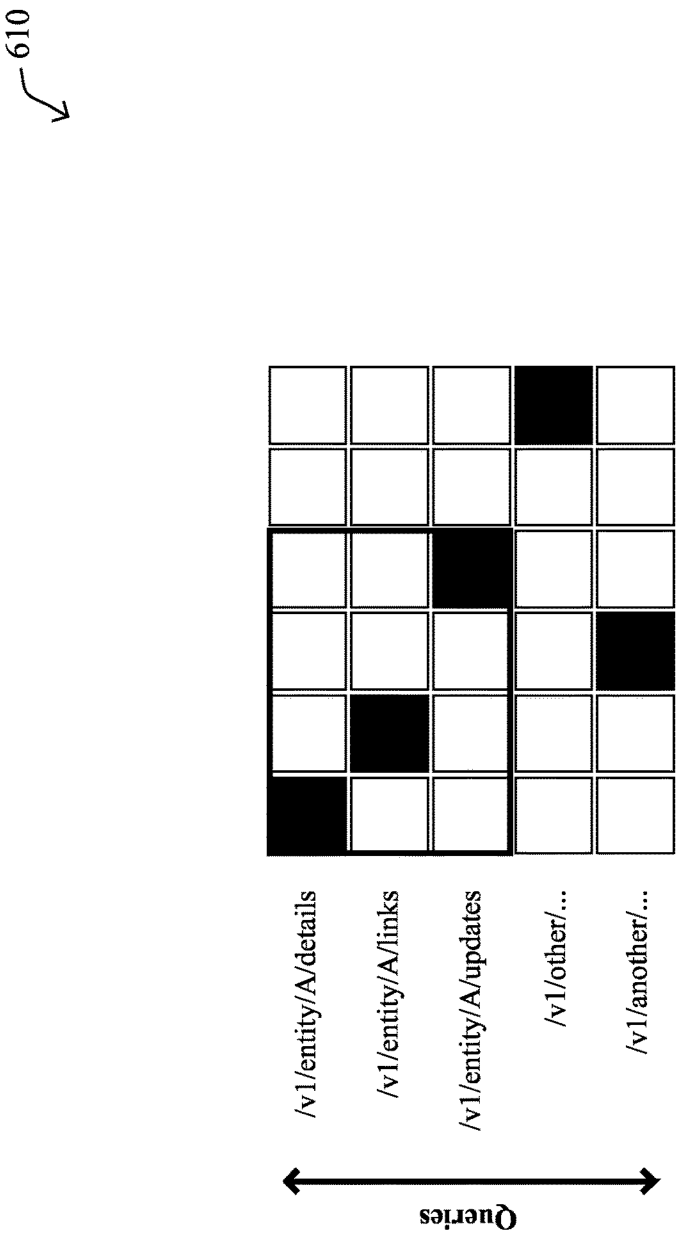

FIG. 6B illustrates an example matrix 610 for a session with N=5 queries, T=6 time bins. Assuming it is frequent enough, request patterns extractor 508 may extract a pattern from this information that can be extracted with K=3 time bins, as highlighted in the boxed area shown.

The output of request patterns extractor 508 may provide the basis for API refactoring/consolidation recommendations that highlight groups of APIs calls that frequently co-occur or follow each other and can be batched together to improve application performance.

Optionally, network visibility engine 510 may integrate with existing network telemetry collection mechanisms for network visibility and telemetry (e.g., SD-WAN systems or analytics solutions) and collects network path data 518 (e.g., loss, latency and jitter) for network paths through which the API requests have been routed. In turn, network visibility engine 510 may join network path data 518 with user sessions in trace data 516 such as by mapping users to IP addresses and then SD-WAN sites, and then to paths and their corresponding metrics. Network visibility engine 510 may then make the corresponding metrics available to UI engine 512, as detailed below. Note that these metrics are agnostic to API paths, i.e., all API requests under a given domain are likely going through the same set of network path(s) at any given point in time, independently of details of the query.

In various embodiments, UI engine 512 may be responsible for providing a API call consolidation recommendation 522 to a user interface 520 for display (or audibly, etc.). For instance, UI engine 512 may indicate that a set of API calls are frequently co-occurring for a given application and can be consolidated. In various embodiments, UI engine 512 may also include in a recommendation an indication of the performance savings associated with implementing the recommendation. For instance, recommendation 522 may indicate a reduction in latency computed by UI engine 512, where API call consolidation recommendation 522 to be implemented. In other instances, API call consolidation recommendation 522 may also indicate the expected effects of implementing recommendation 522 on the users of the application (e.g., in terms of QoE, etc.).

In some instances, API call consolidation recommendation 522 may also include examples of past queries with request/response pairs from APM or RUM for detailed analysis by the user of user interface 520. In addition, the distribution of network path metrics over sites from network visibility engine 510 could also be included, to provide some insights on the type of common network condition on the path(s) going to the API.

Another potential function of UI engine 512 relates to the ability of a user to 'silence' certain types of recommendations, so that they are not shown again (e.g., permanently or for a predefined amount of time). Silencing actions can also be grouped by query prefix to identify whether all recommendations below a certain prefix might correspond to false positives.

In one embodiment, UI engine 512 may be implemented as a standalone component, where recommendations can be reviewed independently of existing tools. In another embodiment, the functionality provided by UI engine 512 may be integrated directly into existing APM tools, for greater ease of use.

Finally, consolidated API gateway 514 may be configured to automatically make available API endpoints corresponding to the consolidation recommendations. For instance, assume that two API calls are made to query the same database, but for different sets of information. In such a case, rather than perform each of these calls separately, they could be consolidated into a single API call that queries both sets of information, at the same time, via consolidated API gateway 514. In addition, consolidated API gateway 514 can also be used to test and/or roll out the recommendation without having to make substantial code modifications, thereby simplifying adoption.

Figure 7:
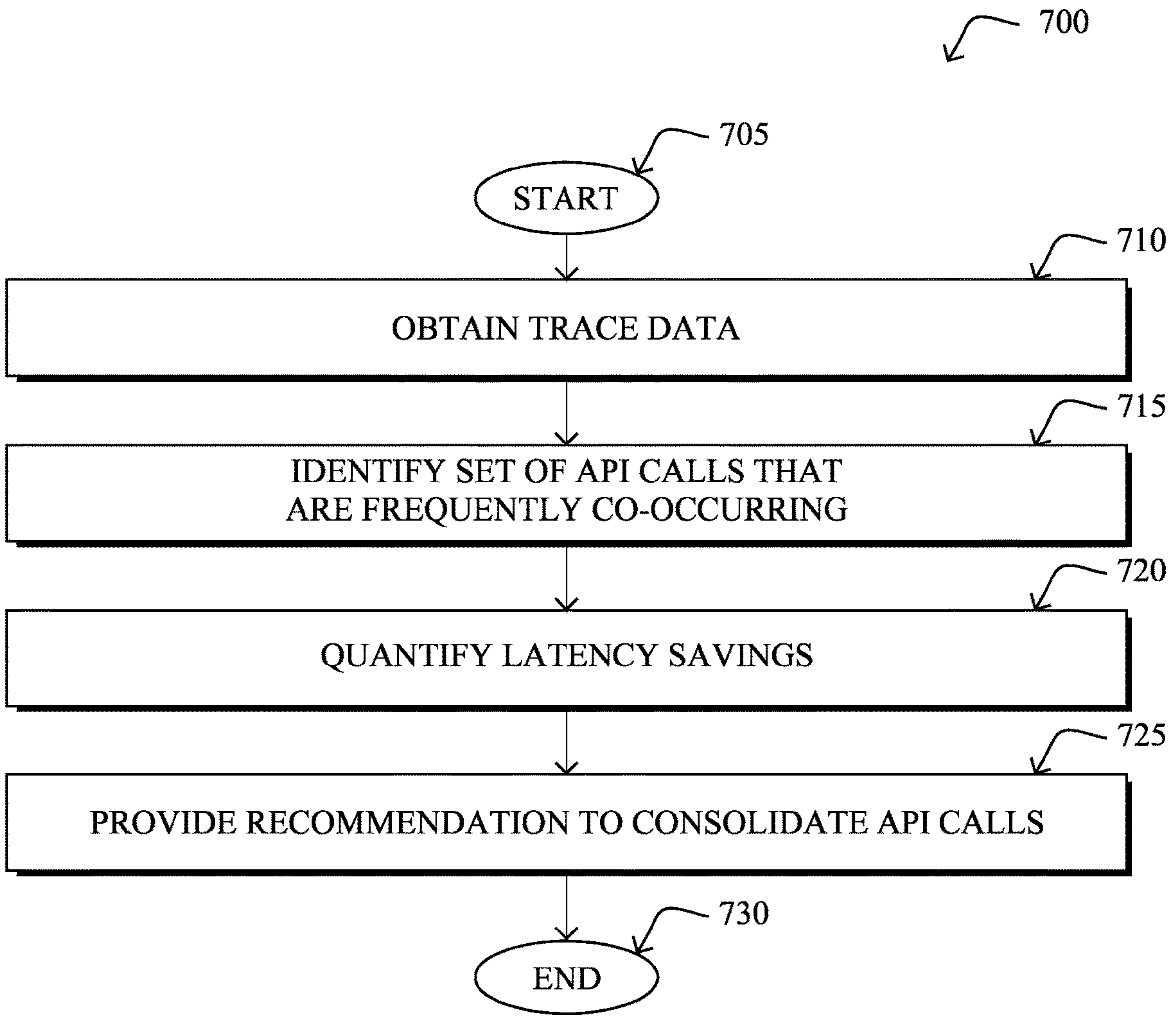
FIG. 7 illustrates an example simplified procedure for API consolidation recommendations to improve web application QoE.

FIG. 7 illustrates an example simplified procedure 700 (e.g., a method) procedure for API consolidation recommendations to improve web application QoE, in accordance with one or more embodiments described herein. For example, a non-generic, specifically configured device (e.g., device 200), such as a router, firewall, controller for a network (e.g., an SDN controller or other device in communication therewith), or the like, may perform procedure 700 by executing stored instructions (e.g., application experience optimization process 248). The procedure 700 may start at step 705, and continues to step 710, where, as described in greater detail above, the device may obtain trace data indicative of application programming interface calls made during sessions between clients and an application accessible via a network. In one embodiment, the trace data comprises application performance monitoring (APM) trace data associated with the sessions. In a further embodiment, the trace data comprises real user monitoring (RUM) trace data associated with the sessions.

At step 715, as detailed above, the device may identify, based on the trace data, a set of calls among the application programming interface calls that are frequently co-occurring. In some embodiments, the device may do so by disregarding application performance monitoring trace data associated with the sessions, when the real user monitoring trace data is available for the sessions. In some embodiments, the device may do so by using timestamps from the trace data associated with the application programming interface calls to assign them to time bin and by evaluating how frequently any two of the application programming interface calls are made together within any particular bin in the time bins. In another embodiment, the device may do so by replacing variable parameters in call paths associated with the set of calls with placeholders.

At step 720, the device may quantify a latency savings expected to occur were the set of calls to be consolidated into a singular call instead of being made separately, as described in greater detail above. In one embodiment, the latency savings is based in part on path performance metrics collected by the network.

At step 725, as detailed above, the device may provide, to a user interface, a recommendation to consolidate the set of calls into a consolidated call that indicates the latency savings. According to various embodiments, the device may also configure a gateway to perform the set of calls in response to receiving the consolidated call. In one embodiment, the device may also prevent a further recommendation to consolidate the set of calls into a consolidated call from being provided to the user interface, based on a silence request from the user interface. In some embodiments, the user interface is provided via an application performance monitoring (APM) platform.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for API consolidation recommendations to improve web application QoE, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

obtaining, by a device, trace data indicative of application programming interface calls sent during sessions between clients and an application accessible via a network;

using timestamps from the trace data associated with the application programming interface calls to assign them to time bins;

evaluating how frequently any two of the application programming interface calls are made together within any particular bin in the time bins;

identifying, by the device and based on the evaluating, a set of calls among the application programming interface calls that are frequently co-occurring;

quantifying, by the device, a latency savings expected to occur were the set of calls to be consolidated into a singular call instead of being made separately; and providing, by the device and to a user interface, a recommendation to consolidate the set of calls into a consolidated call that indicates the latency savings.

2. The method as in claim 1, wherein the trace data comprises application performance monitoring trace data associated with the sessions.

3. The method as in claim 1, wherein the trace data comprises real user monitoring trace data associated with the sessions.

4. The method as in claim 3, wherein identifying the set of calls comprises:

disregarding application performance monitoring trace data associated with the sessions, when the real user monitoring trace data is available for the sessions.

5. The method as in claim 1, further comprising:

configuring, by the device, a gateway to perform the set of calls in response to receiving the consolidated call.

6. The method as in claim 1, wherein the latency savings is based in part on path performance metrics collected by the network.

7. The method as in claim 1, wherein identifying the set of calls comprises:

replacing variable parameters in call paths associated with the set of calls with placeholders.

8. The method as in claim 1, further comprising:

preventing, by the device, a further recommendation to consolidate the set of calls into a consolidated call from being provided to the user interface, based on a silence request from the user interface.

9. The method as in claim 1, wherein the user interface is provided via an application performance monitoring (APM) platform.

10. An apparatus, comprising:

one or more network interfaces;

a processor coupled to the one or more network interfaces; and a memory configured to store one or more instructions that, when executed by the processor, configure the processor to:

obtain trace data indicative of application programming interface calls sent during sessions between clients and an application accessible via a network;

use timestamps from the trace data associated with the application programming interface calls to assign them to time bins;

evaluate how frequently any two of the application programming interface calls are made together within any particular bin in the time bins;

identify, based on the evaluation, a set of calls among the application programming interface calls that are frequently co-occurring;

quantify a latency savings expected to occur were the set of calls to be consolidated into a singular call instead of being made separately; and provide, to a user interface, a recommendation to consolidate the set of calls into a consolidated call that indicates the latency savings.

11. The apparatus as in claim 10, wherein the trace data comprises application performance monitoring trace data associated with the sessions.

12. The apparatus as in claim 10, wherein the trace data comprises real user monitoring trace data associated with the sessions.

13. The apparatus as in claim 12, wherein the processor is configured to identify the set of calls by:

disregarding application performance monitoring trace data associated with the sessions, when the real user monitoring trace data is available for the sessions.

14. The apparatus as in claim 10, wherein the processor is further configured to:

configure a gateway to perform the set of calls in response to receiving the consolidated call.

15. The apparatus as in claim 10, wherein the latency savings is based in part on path performance metrics collected by the network.

16. The apparatus as in claim 10, wherein the processor is configured to identify the set of calls by:

replacing variable parameters in call paths associated with the set of calls with placeholders.

17. The apparatus as in claim 10, wherein the processor is further configured to:

prevent a further recommendation to consolidate the set of calls into a consolidated call from being provided to the user interface, based on a silence request from the user interface.

18. A tangible, non-transitory, computer-readable medium storing program instructions that cause a device to execute a process comprising:

obtaining, by the device, trace data indicative of application programming interface calls sent during sessions between clients and an application accessible via a network, the trace data indicating, for individual ones of the application programming interface calls, when the respective application programming interface call was sent;

identifying, by the device and based on the trace data, a set of calls among the application programming interface calls that are frequently sent within a same portion of the sessions;

identifying, by the device and for individual ones of the set of calls, an amount of time from sending a respective call to receiving a response to the respective call;

quantifying, by the device and based on the amount of time for individual ones of the set of calls, a latency savings expected to occur were the set of calls to be consolidated into a singular call instead of being made separately; and configuring, by the device, a component to consolidate the set of calls into the singular call.

19. The tangible, non-transitory, computer-readable medium as in claim 18, wherein the identifying the amount of time for individual ones of the set of calls is based on path performance metrics collected by the network.

20. The tangible, non-transitory, computer-readable medium as in claim 18, wherein the component includes at least one of a software application or a hardware device associated with one or more of the sessions.

* * * * *